United States Patent
Mizutani et al.

(10) Patent No.: US 10,798,542 B2
(45) Date of Patent: Oct. 6, 2020

(54) INFORMATION PROVIDING SYSTEM AND SERVER

(71) Applicant: TOYOTA JIDOSHA KABUSHIKI KAISHA, Toyota-shi, Aichi-ken (JP)

(72) Inventors: Atsushi Mizutani, Toyota (JP); Daiki Kaneichi, Nisshin (JP); Hirotaka Karube, Toyota (JP); Jun Kondo, Nisshin (JP); Kenichi Komuro, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 18 days.

(21) Appl. No.: 16/174,580

(22) Filed: Oct. 30, 2018

(65) Prior Publication Data

US 2019/0132720 A1    May 2, 2019

(30) Foreign Application Priority Data

Nov. 1, 2017  (JP) .................................. 2017-212087

(51) Int. Cl.
  *H04W 4/44* (2018.01)
  *G05D 1/00* (2006.01)
  (Continued)

(52) U.S. Cl.
  CPC ............... *H04W 4/44* (2018.02); *B60L 53/14* (2019.02); *B60L 53/36* (2019.02); *B60L 53/37* (2019.02);
  (Continued)

(58) Field of Classification Search
  CPC ....... H04W 4/44; H04W 12/06; H04W 84/12; H04W 88/02; G05D 1/0088; B60L 53/00;
  (Continued)

(56) References Cited

U.S. PATENT DOCUMENTS

| 8,720,968 B2 * | 5/2014 | Zalan | E05B 83/34 |
|---|---|---|---|
| | | | 296/97.22 |
| 8,845,001 B2 * | 9/2014 | Kotama | B60L 53/16 |
| | | | 296/97.22 |

(Continued)

FOREIGN PATENT DOCUMENTS

| JP | 2012128587 A | 7/2012 |
|---|---|---|
| JP | 2013115873 A | 6/2013 |

(Continued)

OTHER PUBLICATIONS

United States Patent and Trademark Office, Final Office Action issued to U.S. Appl. No. 16/174,684 dated Mar. 23, 2020, 29 pages.

(Continued)

*Primary Examiner* — Ruolei Zong
(74) *Attorney, Agent, or Firm* — Hunton Andrews Kurth LLP

(57) ABSTRACT

An information providing system includes: a plurality of vehicles each configured to perform inter-vehicle charging; and a server. Each of the plurality of vehicles is configured to transmit unattended power-supplying permission information to the server when the user performs an operation of permitting unattended power supplying. In the matching process, the server is configured to permit to set, as a power-supplying vehicle, a vehicle having transmitted the unattended power-supplying permission information. The server is configured to notify, to the unattended power-supplying vehicle matched through the matching process, a confirmed matching content including information of the power-receiving vehicle. The unattended power-supplying vehicle having received this notification is configured to unlock a lid, which covers a power-supplying connector of the unattended power-supplying vehicle, and permit the unattended power supplying in response to the matched (Continued)

power-receiving vehicle being parked in proximity of the unattended power-supplying vehicle.

5 Claims, 10 Drawing Sheets

(51) Int. Cl.
*B60L 53/60* (2019.01)
*B60L 53/36* (2019.01)
*B60L 53/14* (2019.01)
*B60L 53/37* (2019.01)
*H02J 7/34* (2006.01)

(52) U.S. Cl.
CPC ............ *B60L 53/60* (2019.02); *G05D 1/0088* (2013.01); *H02J 7/342* (2020.01); *B60L 2240/62* (2013.01)

(58) Field of Classification Search
CPC ...... B60L 53/36; B60L 53/37; B60L 2240/62; B60L 2240/72; B60L 53/65; B60L 53/14; B60L 53/60; H02J 7/342
USPC ........................................................ 709/217
See application file for complete search history.

(56) References Cited

U.S. PATENT DOCUMENTS

| | | | |
|---|---|---|---|
| 9,407,105 B2 | 8/2016 | Hyde et al. | |
| 10,011,181 B2* | 7/2018 | Dudar | H01F 38/14 |
| 10,333,338 B2 | 6/2019 | Zenner et al. | |
| 2002/0065703 A1 | 5/2002 | Garg | |
| 2009/0313033 A1 | 12/2009 | Hafner et al. | |
| 2011/0202418 A1* | 8/2011 | Kempton | B60L 53/665 705/26.1 |
| 2011/0224900 A1 | 9/2011 | Hiruta et al. | |
| 2011/0238519 A1 | 9/2011 | Basak et al. | |
| 2012/0146582 A1 | 6/2012 | Lei et al. | |
| 2012/0303259 A1 | 11/2012 | Prosser | |
| 2014/0089064 A1 | 3/2014 | Hyde et al. | |
| 2014/0188318 A1* | 7/2014 | Langgood | G06F 17/00 701/22 |
| 2014/0324248 A1 | 10/2014 | Huntzicker | |
| 2014/0375272 A1 | 12/2014 | Johnsen et al. | |
| 2015/0123607 A1 | 5/2015 | Fujita et al. | |
| 2018/0086223 A1 | 3/2018 | Lindemann et al. | |
| 2018/0260882 A1* | 9/2018 | Friedman | G06Q 20/322 |
| 2018/0307226 A1* | 10/2018 | Chase | B60L 53/68 |
| 2018/0329429 A1* | 11/2018 | Yamaguchi | G05D 1/0297 |
| 2019/0001833 A1* | 1/2019 | Coburn | B60L 53/16 |
| 2019/0130661 A1 | 5/2019 | Mizutani et al. | |

FOREIGN PATENT DOCUMENTS

| | | |
|---|---|---|
| JP | 2013-130963 A | 7/2013 |
| JP | 2014204494 A | 10/2014 |
| WO | 2014010295 A1 | 1/2014 |

OTHER PUBLICATIONS

United States Patent and Trademark Office, Office Action issued to U.S. Appl. No. 16/174,684 dated Dec. 4, 2019, 27 pages.
United States Patent and Trademark Office, Advisory Action issued to U.S. Appl. No. 16/174,684 dated Jun. 2, 2020, 5 pages.
United States Patent and Trademark Office, Non-Final Office Action issued to U.S. Appl. No. 16/174,684 dated Jul. 7, 2020, 22 pages.

* cited by examiner

FIG.10

```
POWER-RECEIVING
VEHICLE          POWER-RECEIVING      SERVER
                 REQUEST              MATCHING
                 ----------→          START
                                        │
                                        ▼                S110
                                  ┌──────────────────┐
                                  │ SET CANDIDATE    │
                                  │ POWER-RECEIVING  │
                                  │ VEHICLE          │
                                  └──────────────────┘
                                        │                S111
                                  ┌──────────────────┐
                                  │ SET CANDIDATE    │
                                  │ POWER-SUPPLYING  │
                                  │ VEHICLE          │
                                  └──────────────────┘
                                        │                S120
                                  ╱────────────────╲       POWER-SUPPLYING
                                 ╱  CANDIDATE       ╲      VEHICLE
                                ╱  POWER-SUPPLYING   ╲
                        NO     ╱  VEHICLE IS UNATTENDED╲
                    ◄─────────╱  POWER-SUPPLYING       ╲
                              ╲  PERMITTED VEHICLE?   ╱
                               ╲                     ╱
                                ╲                   ╱
                                 ╲─────────────────╱
                                        │ YES
                                        ▼                S121
                                  ┌──────────────────┐
                                  │ REQUEST TO OBTAIN│   REQUEST
                                  │ PARKING          │- - - - - →
                                  │ INFORMATION      │
                                  └──────────────────┘
                                        │                S122
                                  ┌──────────────────┐
                                  │ OBTAIN PARKING   │←- - - - -
                                  │ INFORMATION      │   RESPONSE
                                  └──────────────────┘
                                        │                S123
                                  ╱────────────────╲
                                 ╱  UNATTENDED      ╲        USER
                        NO      ╱   POWER-SUPPLYING  ╲       TERMINAL
                    ◄──────────╱   POSSIBLE STATE?   ╱
                                ╲                   ╱
                                 ╲─────────────────╱
                                        │ YES
                                        ▼                S126
                                  ┌──────────────────┐
                                  │ MAKE INQUIRY AS  │
                                  │ TO WHETHER TO    │   INQUIRY
                                  │ PERFORM UNATTENDED│- - - - - →
                                  │ POWER            │
                                  │ SUPPLYING        │
                                  └──────────────────┘
                                        │                S128
                                  ╱────────────────╲
                                 ╱ UNATTENDED POWER ╲←- - - - -
                        NO      ╱  SUPPLYING        ╲    RESPONSE
                    ◄──────────╱   PERMITTED?       ╱
                                ╲                   ╱
                                 ╲─────────────────╱
                                        │ YES
                    ┌─────────┐         ▼                S130
                    │ S150    │   ┌──────────────────┐
                    │NOTIFY   │   │ CONFIRM MATCHING │
                ◄───│THAT     │   │ CONTENT          │
                    │MATCHING │   └──────────────────┘
                    │IS NOT   │         │                S140
                    │ESTABLISHED│ ┌──────────────────┐
                    └─────────┘   │ NOTIFY CONFIRMED │
                ◄- - - - - - - - │ MATCHING CONTENT │- - - - - →
                  AUTHENTICATION  └──────────────────┘    AUTHENTICATION
                  KEY                   │                 KEY
                                        ▼
                                      END
```

INFORMATION PROVIDING SYSTEM AND SERVER

This nonprovisional application is based on Japanese Patent Application No. 2017-212087 filed on Nov. 1, 2017, with the Japan Patent Office, the entire contents of which are hereby incorporated by reference.

BACKGROUND

Field

The present disclosure relates to an information providing system for providing information to an electrically powered vehicle, as well as a server.

Description of the Background Art

Japanese Patent Laying-Open No. 2013-130963 discloses a charging system that provides a service for aiding to charge an electrically powered vehicle that needs to be charged. This charging system includes a server and a plurality of electrically powered vehicles. The server verifies information of a power-receiving vehicle requesting charging against information of power-supplying permitted vehicles having transmitted indications that they are capable of supplying power to another vehicle, selects a power-supplying vehicle that satisfies a required condition from the power-supplying permitted vehicles, and provides information of the selected power-supplying vehicle to the power-receiving vehicle.

SUMMARY

In order to actually supply power from the power-supplying vehicle to the power-receiving vehicle, preliminary operations for supplying power need to be performed both in the power-supplying vehicle and the power-receiving vehicle, such as an operation of connecting a charging cable to the power-supplying vehicle and the power-receiving vehicle. If an operation needed to be performed in one of the power-supplying vehicle and the power-receiving vehicle cannot be performed by a user of the other of the power-supplying vehicle and the power-receiving vehicle, the following restriction is resulted: the users of the both matched vehicles need to be in proximity of the vehicles. This may lead to decreased convenience of matching service. Moreover, the users of the both vehicles need to face each other when actually supplying power. This also may lead to a matter of privacy.

The present disclosure has been made to solve the above-described problem, and has an object to enable supply of power from a power-supplying vehicle to a power-receiving vehicle even without attendance of a user of the power-supplying vehicle.

(1) An information providing system according to the present disclosure includes: a plurality of vehicles each configured to exchange power with another vehicle; and a server. The server is configured to communicate with the plurality of vehicles and is configured to perform a matching process for setting a power-supplying vehicle and a power-receiving vehicle from the plurality of vehicles and for matching the set power-supplying vehicle and power-receiving vehicle. Each of the plurality of vehicles is configured to transmit unattended power-supplying permission information to the server when a user of the vehicle performs an operation of permitting unattended power supplying in which power is supplied to another vehicle without attendance of the user. In the matching process, the server is configured to permit to set, as the power-supplying vehicle, a vehicle included in the plurality of vehicles and having transmitted the unattended power-supplying permission information.

According to the above-described configuration, the vehicle for which the user performs the operation of permitting the unattended power supplying is permitted to be set as the power-supplying vehicle in the matching process performed by the server. Accordingly, even without attendance of the user of the power-supplying vehicle, power can be supplied from the power-supplying vehicle to the power-receiving vehicle.

(2) In a certain embodiment, the server is configured to transmit a matching notification to the power-supplying vehicle matched in the matching process, the matching notification including information of the matched power-receiving vehicle. The vehicle having transmitted the unattended power-supplying permission information to the server is configured to permit the unattended power supplying for the matched power-receiving vehicle when the matching notification is received from the server.

According to the above-described configuration, the vehicle for which the user performs the operation of permitting the unattended power supplying can supply power to the power-receiving vehicle matched by the server, even without attendance of the user.

(3) In a certain embodiment, each of the plurality of vehicles includes: a power supplier connectable to another vehicle; a lid configured to be opened and closed for the power supplier; and a locking device configured to lock the lid in a close state. When the matching notification is received from the server, the vehicle having transmitted the unattended power-supplying permission information to the server is configured to unlock the lid and permit the unattended power supplying for the matched power-receiving vehicle in response to the matched power-receiving vehicle being parked in proximity of the vehicle having transmitted the unattended power-supplying permission information.

According to the above-described configuration, the user of the power-receiving vehicle can automatically unlock the lid of the matched unattended power-supplying vehicle only by parking the power-receiving vehicle in proximity of the power-supplying vehicle.

(4) In a certain embodiment, each of the plurality of vehicles includes a detector configured to detect surrounding information of the vehicle. In the matching process, the server is configured to permit to set, as the power-supplying vehicle, a vehicle that is included in the plurality of vehicles and that has transmitted the unattended power-supplying permission information and that is determined, based on a detection result of the detector, to be in a state that power is able to be supplied to another vehicle.

According to the above-described configuration, a vehicle that is not in the state that power can be supplied to another vehicle is excluded from subjects of the matching even when the user of such a vehicle performs the operation of permitting the unattended power supplying. Accordingly, it is possible to prevent occurrence of the following situation in advance: the power-receiving vehicle is moved to near the unattended power-supplying vehicle after the matching but the parking state of the power-supplying vehicle is not in the state that power can be supplied to another vehicle, with the result that power cannot be supplied.

(5) A server according to the present disclosure includes: a communicator configured to communicate with a plurality of vehicles each configured to exchange power with another vehicle; and a controller configured to perform a matching process for setting a power-supplying vehicle and a power-receiving vehicle from the plurality of vehicles and for matching the set power-supplying vehicle and power-receiving vehicle. Each of the plurality of vehicles is configured to transmit unattended power-supplying permission information to the communicator when a user of the vehicle performs an operation of permitting unattended power supplying in which power is supplied to another vehicle without attendance of the user. In the matching process, the controller is configured to permit to set, as the power-supplying vehicle from the plurality of vehicles, a vehicle having transmitted the unattended power-supplying permission information.

According to the above-described configuration, the vehicle for which the user performs the operation of permitting the unattended power supplying is permitted to be set as a power-supplying vehicle in the matching process performed by the server. Accordingly, even without attendance of the user of the power-supplying vehicle, power can be supplied from the power-supplying vehicle to the power-receiving vehicle.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a second flowchart showing an exemplary detailed procedure of a matching process performed by the server.

DESCRIPTION OF THE PREFERRED EMBODIMENTS

Figure 1:
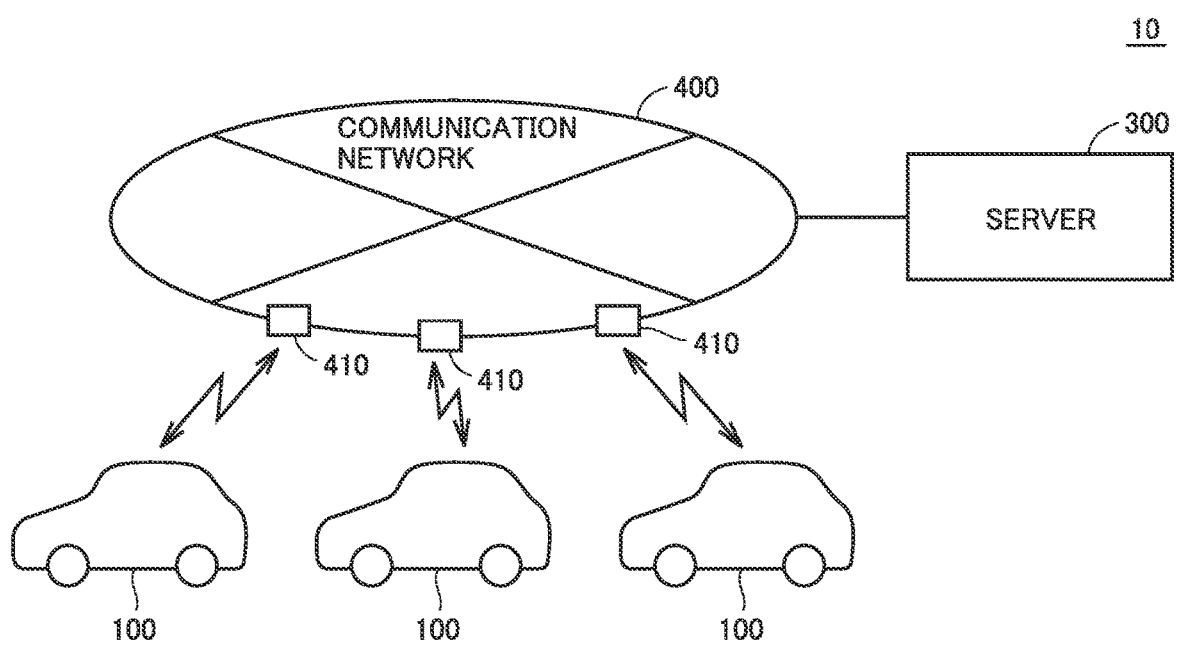
FIG. 1 schematically shows an entire configuration of an information providing system.

The following describes embodiments of the present disclosure with reference to figures in detail. It should be noted that the same or corresponding portions are given the same reference characters and are not described repeatedly.
<System Configuration>

FIG. 1 schematically shows an entire configuration of an information providing system 10 according to the present embodiment. Information providing system 10 includes a plurality of electrically powered vehicles (hereinafter, also simply referred to as "vehicles") 100, and a server 300. Each vehicle 100 and server 300 are configured to communicate with each other via a communication network 400 such as the Internet or a telephone network. It should be noted that each vehicle 100 is configured to send and receive information to and from a base station 410 of communication network 400 through wireless communication.

As described below with reference to FIG. 2, vehicle 100 is an electric vehicle (EV) configured to generate driving power for traveling using electric power from a power storage device mounted thereon and to permit charging of the power storage device using electric power supplied from a power supply external to the vehicle.

Server 300 communicates with vehicle 100 and provides vehicle 100 with information about other vehicles.

Figure 2:
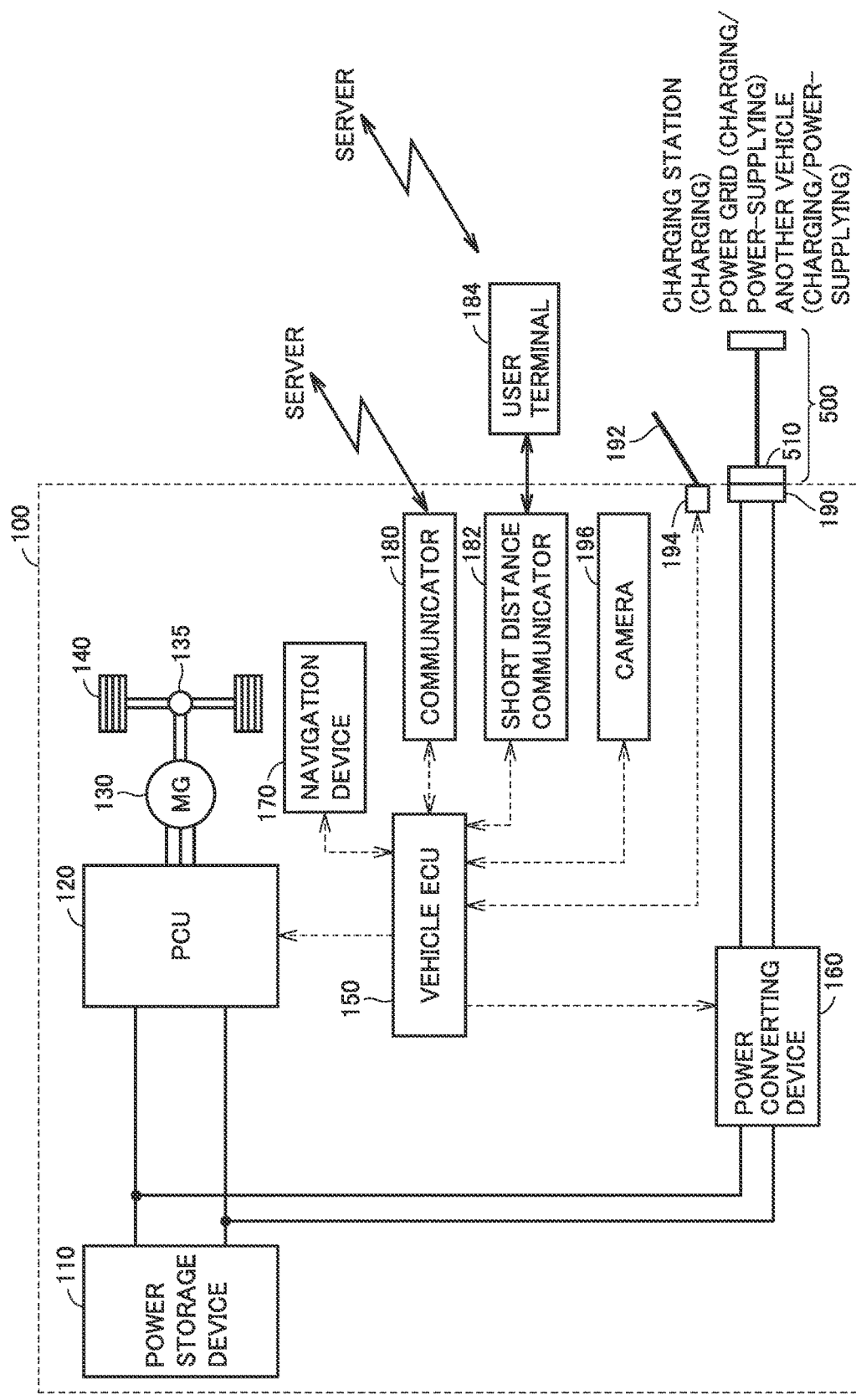
FIG. 2 shows an exemplary configuration of a vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, and a navigation device 170.

In vehicle 100, power storage device 110 can be charged using power supplied from a charging station or commercial power grid external to the vehicle. Moreover, vehicle 100 can output power of power storage device 110 to outside the vehicle, and can perform "inter-vehicle charging", which is exchange of electric power between vehicle 100 and another vehicle.

Figure 3:
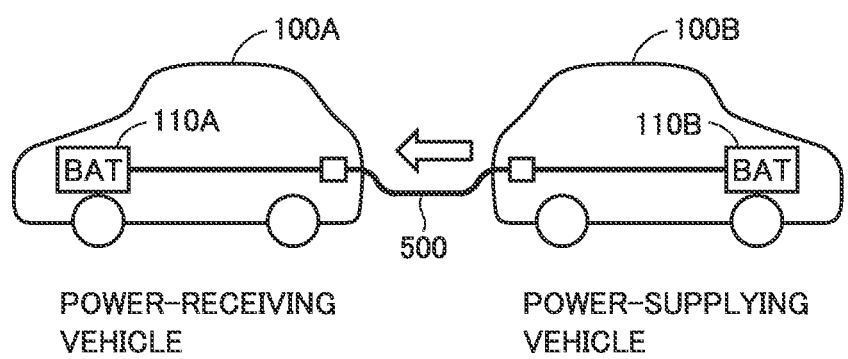
FIG. 3 illustrates inter-vehicle charging.

FIG. 3 illustrates the inter-vehicle charging. For the inter-vehicle charging, as shown in FIG. 3, a vehicle 100 (hereinafter, also referred to as "power-receiving vehicle 100A") to receive power and a vehicle 100 (hereinafter, also referred to as "power-supplying vehicle 100B") to supply power are connected to each other via a charging cable 500. Then, power is discharged from a power storage device 110B of power-supplying vehicle 100B to charge a power storage device 110A of power-receiving vehicle 100A.

Turning back to FIG. 2, power storage device 110 is configured to be charged and discharged. Power storage device 110 is configured to include a secondary battery such as a lithium ion battery or a nickel-hydrogen battery, or include a power storage element such as an electric double layer capacitor, for example.

Power storage device 110 supplies electric power to PCU 120 so as to generate driving power of vehicle 100. Further, power storage device 110 stores electric power generated by motor generator 130.

PCU 120 is configured to include power converting devices such as a converter and an inverter, which are not shown in the figure. Each of the converter and the inverter is controlled by a control signal from vehicle ECU 150 to convert DC power from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power thus generated is converted by PCU 120 into charging power for power storage device 110.

Vehicle 100 further includes a communicator 180 and a short distance communicator 182. Communicator 180 is an interface for direct wireless communicative connection to communication network 400. Communicator 180 can communicate with server 300 connected to communication network 400.

Short distance communicator 182 is an interface for making a short distance wireless communication between short distance communicator 182 and a user terminal 184 (such as a smartphone) carried by the user of vehicle 100 or making a short distance wireless communication between short distance communicator 182 and a short distance communicator 182 of another vehicle. It should be noted that user terminal 184 is configured to be communicatively connected to communication network 400 directly. Therefore, via user terminal 184, short distance communicator 182 can communicate with server 300 connected to communication network 400.

As a configuration for exchanging power with another vehicle or the like, vehicle 100 further includes a power converting device 160, a connector 190, a lid 192, and a locking device 194.

Power converting device 160 is connected between power storage device 110 and connecter 190. Power converting device 160 is controlled by a control signal from vehicle ECU 150. When charging power storage device 110 using power supplied from another vehicle or the like, power converting device 160 converts the power supplied from the other vehicle into power with which power storage device 110 can be charged. On the other hand, when supplying power of power storage device 110 to another vehicle or the like, power converting device 160 converts the power of power storage device 110 into power that can be output to the other vehicle or the like.

Connector 190 is configured to allow a charging connector 510 of charging cable 500 to be connected thereto. Lid 192 is configured to be opened or closed for connector 190. When lid 192 is in the close state, connector 190 is covered with lid 192, with the result that charging cable 500 cannot be connected to connector 190. On the other hand, when lid 192 is in the open state, charging cable 500 can be connected to connector 190. When lid 192 is opened and charging cable 500 is connected to connector 190, vehicle 100 can exchange power with another vehicle or the like.

Locking device 194 is switched to one of a locking state and an unlocking state in response to a control signal from vehicle ECU 150. The locking state is a state in which lid 192 is fixed to the close state, whereas the unlocking state is a state in which lid 192 is not fixed to the close state. While locking device 194 is in the unlocking state, the user can manually open and close lid 192 from outside the vehicle.

Vehicle 100 further includes a camera 196 configured to capture an image of surroundings of vehicle 100. Image information captured by camera 196 is transmitted to vehicle ECU 150.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

Figure 4:
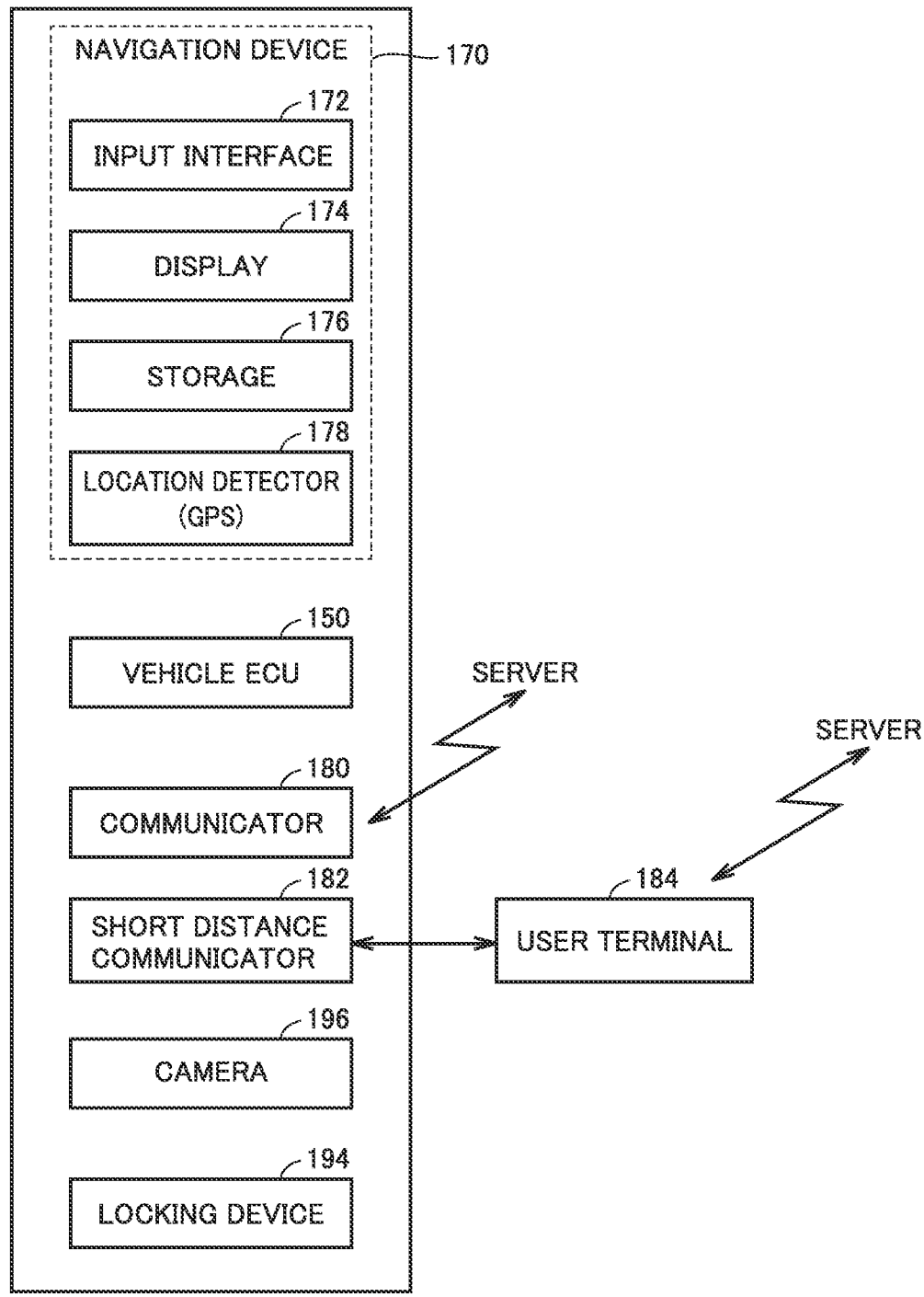
FIG. 4 is a block diagram showing a configuration in relation with a navigation device in the vehicle.

FIG. 4 is a block diagram showing a configuration in relation with navigation device 170 in vehicle 100. Navigation device 170 includes an input interface 172, a display 174, a storage 176, and a location detector 178 as shown in FIG. 4. Navigation device 170 uses map information stored in storage 176 and location information (GPS information) of vehicle 100 detected by GPS (Global Positioning System) of location detector 178, so as to present the current location of vehicle 100 on a map for the user and provide a navigation to a destination.

Display 174 is constructed of, for example, a liquid crystal panel and presents the current location of vehicle 100 or various information from vehicle ECU 150. Input interface 172 is constructed of a touch panel, a switch, or the like, and receives an operation by the user.

Figure 5:
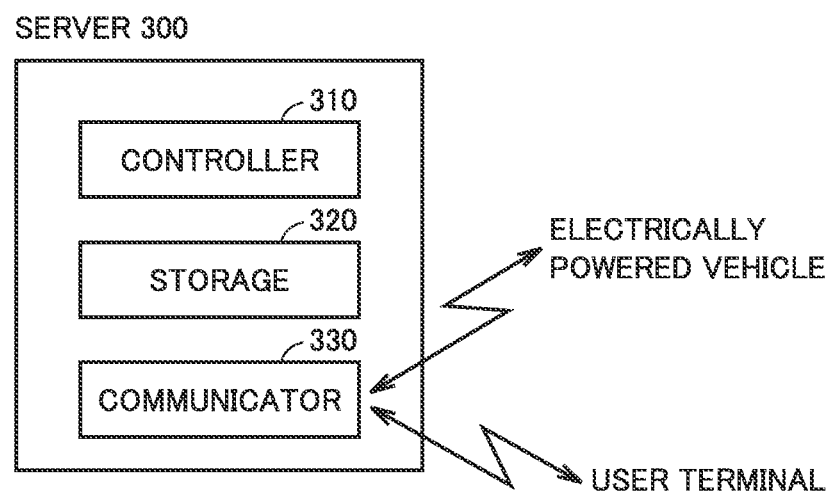
FIG. 5 is a block diagram showing a configuration of a server.

FIG. 5 is a block diagram showing a configuration of server 300. Server 300 includes a controller 310, a storage 320, and a communicator 330.

Communicator 330 is an interface for communication with vehicle 100 or user terminal 184 via communication network 400. In storage 320, the map information, the information received from vehicle 100, and the like are stored.

Based on the information received from vehicle 100 by communicator 330, the information stored in storage 320, and the like, controller 310 performs a process for matching vehicles that are to perform inter-vehicle charging.

<Matching of Vehicles that are to Perform Inter-Vehicle Charging>

As described above, vehicle 100 can perform inter-vehicle charging, which is exchange of power between vehicle 100 and another vehicle. Therefore, when a vehicle 100 (hereinafter, also referred to as "power-receiving requesting vehicle") having a power storage device 110 with a small remaining power amount and requesting reception of power from another vehicle can be matched to a vehicle 100 (hereinafter, also referred to as "power-supplying permitted vehicle") having a power storage device 110 with a large remaining power amount and permitted to supply power to another vehicle, electric energy stored in each vehicle 100 can be utilized effectively.

In view of this, information providing system 10 according to the present embodiment provides a matching service for: setting a candidate power-receiving vehicle and a candidate power-supplying vehicle from a plurality of vehicles 100; performing a "matching process" for matching the vehicles; and notifying a content of the matching to each of the matched vehicles.

Here, in order to actually perform inter-vehicle charging, various preliminary operations need to be performed in both the power-supplying vehicle and the power-receiving vehicle, such as operations of opening respective lids 192 of the power-supplying vehicle and the power-receiving vehicle and connecting charging cable 500 to the power-supplying vehicle and the power-receiving vehicle. If a preliminary operation needed to be performed in one of the power-supplying vehicle and the power-receiving vehicle cannot be performed by the user of the other of the power-supplying vehicle and the power-receiving vehicle, the following restriction is resulted: the users of the both matched vehicles need to be in proximity of the vehicles. This may lead to decreased convenience of the matching service. Moreover, the users of the both vehicles need to face each other when actually performing inter-vehicle charging. This also may lead to a matter of privacy.

In view of these, in information providing system 10 according to the present embodiment, it is permitted to set, as the power-supplying vehicle in the matching process, a power-supplying permitted vehicle that is unattended by a user. Hereinafter, details of this matching service will be described.

In the description below, for simplicity of explanation, supplying electric power to another vehicle without attendance of a user will be also referred to as "unattended power supplying". Moreover, a power-supplying permitted vehicle permitted by a user to perform unattended power supplying will be also referred to as "unattended power-supplying permitted vehicle", whereas a power-supplying permitted vehicle not permitted by a user to perform unattended power supplying will be also referred to as "attended power-supplying permitted vehicle".

Figure 6:
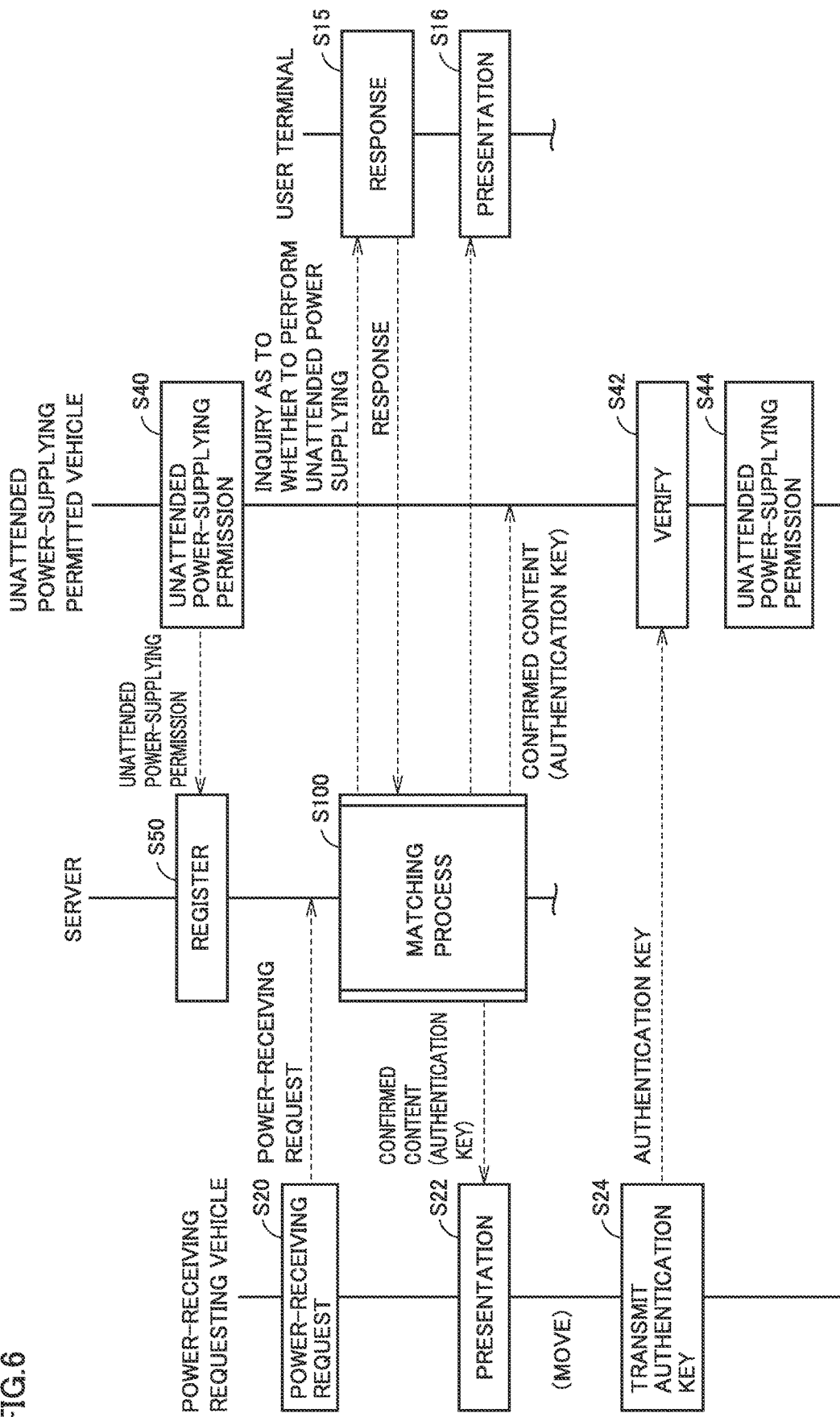
FIG. 6 is a first sequence diagram showing an exemplary process performed among a power-receiving requesting vehicle, the server, an unattended power-supplying permitted vehicle, and a user terminal.

FIG. 6 is a sequence diagram showing an exemplary process performed among the power-receiving requesting vehicle, server 300, the unattended power-supplying permitted vehicle, and user terminal 184, which are included in information providing system 10. User terminal 184 is held by the user of the unattended power-supplying permitted vehicle. It should be noted that for simplicity of explanation, FIG. 6 illustrates one power-receiving requesting vehicle and one unattended power-supplying permitted vehicle; however, there may be actually a plurality of power-receiving requesting vehicles, a plurality of unattended power-supplying permitted vehicles, and a plurality of attended power-supplying permitted vehicles not shown in the figure.

A vehicle 100 (unattended power-supplying permitted vehicle) is triggered to transmit unattended power-supplying permission information to server 300 by a user performing an operation of permitting unattended power supplying (step S10). The unattended power-supplying permission information includes information such as: a vehicle ID of the vehicle; a current location of the vehicle; a power amount (hereinafter, also referred to as "possible power-supplying amount") that can be supplied from the vehicle to another vehicle; and the like. The unattended power-supplying permission information further includes information such as: a flag (hereinafter, also referred to as "unattended power-supplying permission flag") indicating that the user of the vehicle permits unattended power supplying; contact information of user terminal 184 held by the user of the vehicle; and the like.

It should be noted that the user inside the vehicle may input the operation of permitting unattended power supplying, directly from input interface 172 of vehicle 100 or indirectly from user terminal 184 that communicates with vehicle 100. On the other hand, the user outside the vehicle can input the operation of permitting unattended power supplying, indirectly from user terminal 184 that communicates with vehicle 100.

When server 300 receives the unattended power-supplying permission information, server 300 registers, as an unattended power-supplying permitted vehicle, the vehicle having transmitted the unattended power-supplying permission information, and stores the unattended power-supplying permission information of the vehicle into storage 320 (step S50).

It should be noted that although not shown in FIG. 6, a vehicle 100 (attended power-supplying permitted vehicle) is triggered to transmit attended power-supplying permission information to server 300 by a user performing an operation of permitting to supply power to another vehicle with the user being in proximity of the vehicle (step S10). The attended power-supplying permission information includes information such as a vehicle ID of the vehicle, a current location of the vehicle, a possible power-supplying amount of the vehicle, and the like, but does not include information such as an unattended power-supplying permission flag, contact information of user terminal 184, and the like. When server 300 receives the attended power-supplying permission information, server 300 registers, as an attended power-supplying permitted vehicle, the vehicle having transmitted the attended power-supplying permission information, and stores the attended power-supplying permission information of the vehicle into storage 320.

On the other hand, a vehicle 100 (power-receiving requesting vehicle) is triggered to transmit power-receiving request information to server 300 by a user performing an operation of requesting to receive power from another vehicle (step S20). The power-receiving request information includes information such as: a vehicle ID of the vehicle; a current location of the vehicle; a power amount (hereinafter, also referred to as "requested power-receiving amount") requested by the vehicle to receive power from another vehicle; and the like.

When server 300 receives the power-receiving request information, server 300 sets, as a candidate power-receiving vehicle, the vehicle having transmitted the power-receiving request information, and performs the above-described "matching process" (step S100).

In the matching process, based on the power-receiving request information received from the candidate power-receiving vehicle and respective pieces of stored information of a plurality of power-supplying permitted vehicles (unattended power-supplying permitted vehicles and attended power-supplying permitted vehicles) in storage 320, server 300 sets a vehicle suitable to supply power to the candidate power-receiving vehicle, from the plurality of power-supplying permitted vehicles, and sets the selected vehicle as a candidate power-supplying vehicle.

When the candidate power-supplying vehicle thus set is an unattended power-supplying permitted vehicle, server 300 transmits, to user terminal 184 held by the user of that vehicle, (i) a fact that the vehicle of the user has been set as the candidate power-supplying vehicle and (ii) information about the candidate power-receiving vehicle to be a power-supplying target, and makes an inquiry as to whether to perform unattended power supplying for the candidate power-receiving vehicle. The user having received this inquiry makes a response to server 300 as to whether to perform unattended power supplying by operating user terminal 184 (step S15). When server 300 receives, from the user terminal 184 to which the inquiry has been transmitted, a response indicating that the unattended power supplying is approved, the matching of the candidate power-supplying vehicle and the candidate power-receiving vehicle is confirmed. That is, server 300 formally matches the candidate power-supplying vehicle and the candidate power-receiving vehicle as a power-supplying vehicle and a power-receiving vehicle, respectively.

Then, server 300 notifies a confirmed matching content to the power-supplying vehicle and power-receiving vehicle that are matched. This confirmed matching content includes: the fact that the matching has been confirmed; information about the matched vehicles (the information included in the unattended power-supplying permission information, the information included in the power-receiving request information, and the like); and information of an authentication key to be required to start unattended power supplying. For checking, server 300 also notifies the confirmed matching content to user terminal 184 of the unattended power-supplying vehicle. It should be noted that for checking, server 300 may also notify the confirmed matching content to user terminal 184 of the power-receiving vehicle.

The power-receiving vehicle having received the confirmed matching content from server 300 presents the content of the received notification on display 174 of the power-receiving vehicle (step S22). Accordingly, the user of the power-receiving vehicle can check the location of the unattended power-supplying vehicle matched to the power-receiving vehicle, and can move the power-receiving vehicle toward the location of the unattended power-supplying vehicle. Moreover, the confirmed matching content is also presented on a screen of user terminal 184 having received the confirmed matching content from server 300 (step S16). Accordingly, even when the user of the unattended power-supplying vehicle is at a location distant away from the unattended power-supplying vehicle, the user of the unattended power-supplying vehicle can check: the fact that the vehicle of the user has been matched as an unattended power-supplying vehicle; the information about the power-receiving vehicle matched to the unattended power-supplying vehicle; and the like.

Then, when the user of the power-receiving vehicle moves the power-receiving vehicle to a location in proximity of the matched unattended power-supplying vehicle, stops the power-receiving vehicle therein, and performs an operation of stopping the vehicle system, the power-receiving vehicle transmits a power-supplying start request to the unattended power-supplying vehicle through short distance wireless communication (step S24). The power-supplying start request includes: the vehicle ID of the power-receiving vehicle; and the authentication key received from server 300.

The unattended power-supplying vehicle having received the power-supplying start request from the power-receiving vehicle verifies the authentication key included in the power-supplying start request against the authentication key received from server 300 (step S42). When both the authentication keys coincide with each other, the unattended power-supplying vehicle brings locking device 194 into the unlocking state to unlock lid 192, thereby permitting unattended power supplying (step S44). Accordingly, the user of the power-receiving vehicle can perform an operation of opening lid 192 of the power-supplying vehicle and connecting charging cable 500 to connector 190 of the power-supplying vehicle even without attendance of the user of the power-supplying vehicle, whereby inter-vehicle charging can be performed. It should be noted that the fact that the unattended power supplying is being performed by the user of the power-receiving vehicle is notified from the power-supplying vehicle to user terminal 184 of the power-supplying vehicle in real time.

Figure 7:
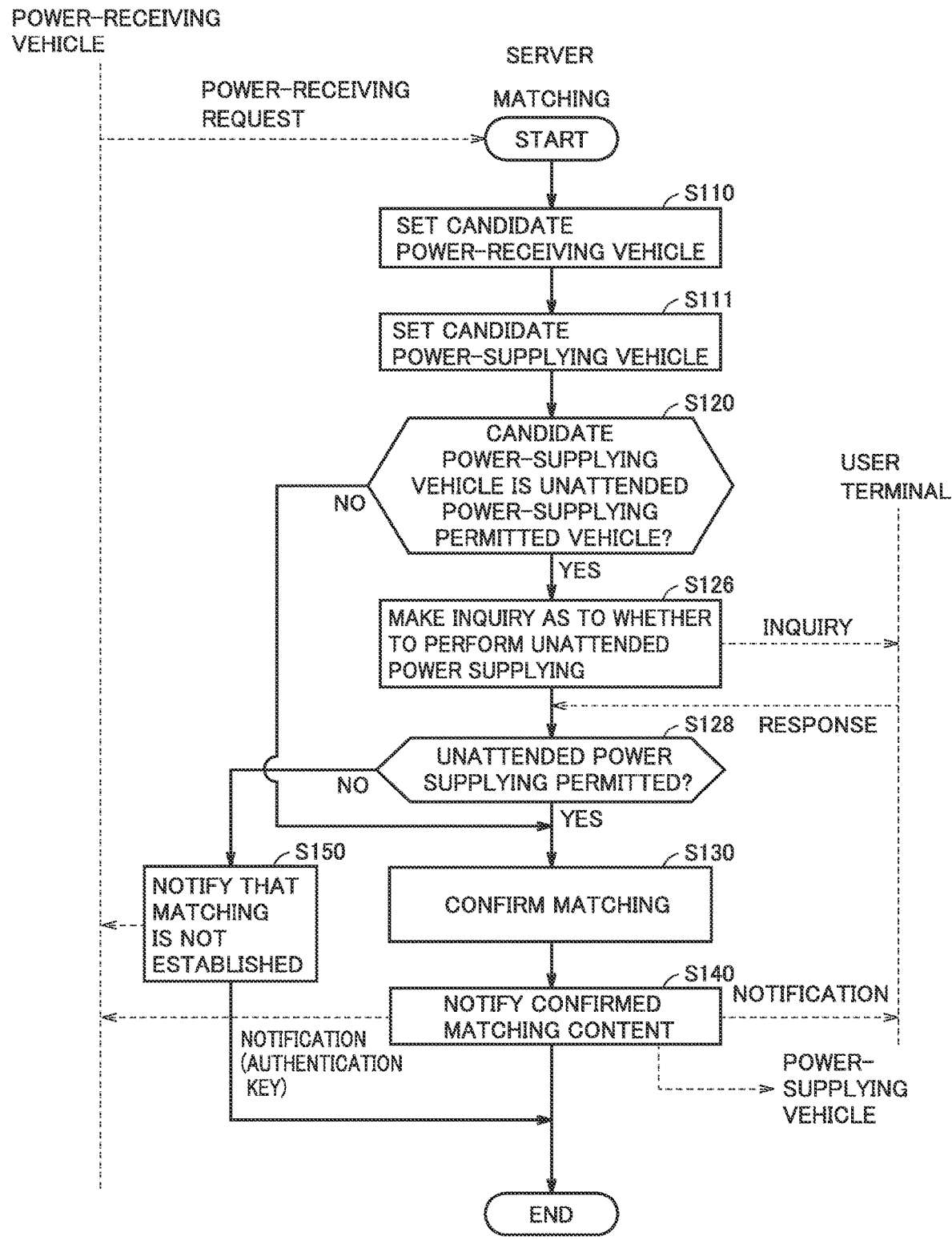
FIG. 7 is a first flowchart showing an exemplary detailed procedure of a matching process performed by the server.

FIG. 7 is a flowchart showing an exemplary detailed procedure of the matching process (step S100 of FIG. 6) performed by server 300. Server 300 is triggered to start the process of this flowchart by receiving the power-receiving request information.

First, server 300 sets, as a candidate power-receiving vehicle, the vehicle having transmitted the power-receiving request information (S110).

Next, server 300 performs a process for setting a candidate power-supplying vehicle suitable to supply power to the candidate power-receiving vehicle, based on the power-receiving request information received from the candidate power-receiving vehicle and respective pieces of stored information of a plurality of power-supplying permitted vehicles (unattended power-supplying permitted vehicles and attended power-supplying permitted vehicles) in storage 320 (step S111). For example, server 300 sets, as the candidate power-supplying vehicle, a power-supplying permitted vehicle whose distance from the candidate power-receiving vehicle is less than a threshold value and whose possible power-supplying amount is the closest to the requested power-receiving amount of the candidate power-receiving vehicle.

Next, server 300 determines whether or not the candidate power-supplying vehicle set by the process of step S111 is an unattended power-supplying permitted vehicle (step S120). This determination is made based on presence/absence of the unattended power-supplying permission flag of the candidate power-supplying vehicle.

When the candidate power-supplying vehicle is an unattended power-supplying permitted vehicle (YES in step S120), server 300 makes an inquiry, as to whether to perform unattended power supplying, to user terminal 184 held by the user of the candidate power-supplying vehicle (step S126).

Next, server 300 determines whether or not a response indicating that the unattended power supplying is approved is received from user terminal 184 to which the inquiry has been made (step S128).

When a response indicating that the unattended power supplying is not approved is received from user terminal 184 (NO in step S128), server 300 notifies the candidate power-receiving vehicle that the matching is not established (step S150).

When a response indicating that the unattended power supplying is approved is received from the user terminal 184 (YES in step S128), server 300 confirms the matching of the candidate power-supplying vehicle and the candidate power-receiving vehicle (step S130).

Next, server 300 notifies the above-described confirmed matching content (information of the authentication key and the like) to the matched power-supplying vehicle and power-receiving vehicle as well as user terminal 184 of the power-supplying vehicle (step S140).

On the other hand, when the candidate power-supplying vehicle is not an unattended power-supplying permitted vehicle (NO in step S120), i.e., when the candidate power-supplying vehicle is an attended power-supplying permitted vehicle, server 300 skips the processes of steps S126 and S128 and confirms the matching of the candidate power-supplying vehicle and the candidate power-receiving vehicle (step S130). It should be noted that also when the candidate power-supplying vehicle is an attended power-supplying permitted vehicle, the candidate power-supplying vehicle may be inquired as to whether to supply power to the candidate power-receiving vehicle.

As described above, information providing system 10 according to the present embodiment includes: the plurality of vehicles 100 each configured to perform inter-vehicle charging; and server 300 configured to communicate with the plurality of vehicles 100.

Each of the plurality of vehicles 100 transmits the unattended power-supplying permission information to server 300 when the user thereof performs the operation of permitting unattended power supplying. Server 300 permits to set, as the power-supplying vehicle in the matching process, vehicle 100 having transmitted the unattended power-supplying permission information.

Then, server 300 notifies, to the unattended power-supplying vehicle matched through the matching process, the confirmed matching content including the information of the power-receiving vehicle. The unattended power-supplying vehicle having received this notification permits unattended power supplying for the matched power-receiving vehicle. Accordingly, even without attendance of the user of the power-supplying vehicle, power can be supplied from the power-supplying vehicle to the power-receiving vehicle. Further, the users of the both vehicles do not need to face each other when actually performing inter-vehicle charging. No matter of privacy arises.

Particularly, the unattended power-supplying vehicle according to the present embodiment unlocks lid 192 of the unattended power-supplying vehicle and permits unattended power supplying in response to the matched power-receiving vehicle being parked in proximity of the unattended power-supplying vehicle. Hence, the user of the power-receiving vehicle can automatically unlock lid 192 of the unattended power-supplying vehicle only by parking the power-receiving vehicle in proximity of the unattended power-supplying vehicle.

Further, the unattended power-supplying vehicle according to the present embodiment permits the unattended power supplying for the power-receiving vehicle only when the authentication key received from server 300 is verified against the authentication key received from the power-receiving vehicle and both the authentication keys coincide with each other. Accordingly, unattended power supplying is suppressed from being wrongly permitted for a power-receiving vehicle matched to a power-supplying vehicle different from the power-supplying vehicle. Hence, unattended power supplying also in consideration of security can be implemented.

<Modification 1>

In the above-described embodiment, it has been illustratively described that the unattended power-supplying vehicle verifies the power-receiving vehicle using the authentication key provided by server 300. However, the unattended power-supplying vehicle may transmit an authorization code of the unattended power-supplying vehicle to the power-receiving vehicle via server 300 and the unattended power-supplying vehicle may use the authorization code of the unattended power-supplying vehicle to verify the power-receiving vehicle.

<Modification 2>

In the above-described embodiment, it has been illustratively described that server 300 automatically selects a candidate power-supplying vehicle (unattended power-supplying permitted vehicle or attended power-supplying permitted vehicle) suitable for a candidate power-receiving vehicle. However, the user of the candidate power-receiving vehicle may be able to preferentially select one of the unattended power-supplying permitted vehicle and the attended power-supplying permitted vehicle for the sake of matching, for example.

<Modification 3>

Since the unattended power supplying is performed by the user of the power-receiving vehicle without attendance of the user of the unattended power-supplying vehicle, people around the unattended power-supplying vehicle may mistakenly recognize that electric power is being stolen. Hence, in order to prevent the people from mistakenly recognizing that electric power is being stolen, the power-supplying vehicle may be provided with means for announcing, to the surroundings, that the unattended power supplying is performed under the user's permission when performing the unattended power supplying between the vehicles matched by server 300.

<Modification 4>

In the above-described embodiment, it has been illustratively described that the unattended power-supplying vehicle permits the unattended power supplying for the power-receiving vehicle only when the authentication key received from server 300 is verified against the authentication key received from the power-receiving vehicle and both the authentication keys coincide with each other. However, the method in which the unattended power-supplying vehicle permits the unattended power supplying for the power-receiving vehicle is not necessarily limited to this.

In a modification 4, server 300 determines whether or not the matched power-receiving vehicle is parked in proximity of the unattended power-supplying vehicle, and transmits an unattended power-supplying permission command to the unattended power-supplying vehicle when the power-receiving vehicle is parked in proximity of the unattended power-supplying vehicle. When the unattended power-supplying permission command is received from server 300, the unattended power-supplying vehicle unlocks lid 192 of the unattended power-supplying vehicle and permits the unattended power supplying.

Figure 8:
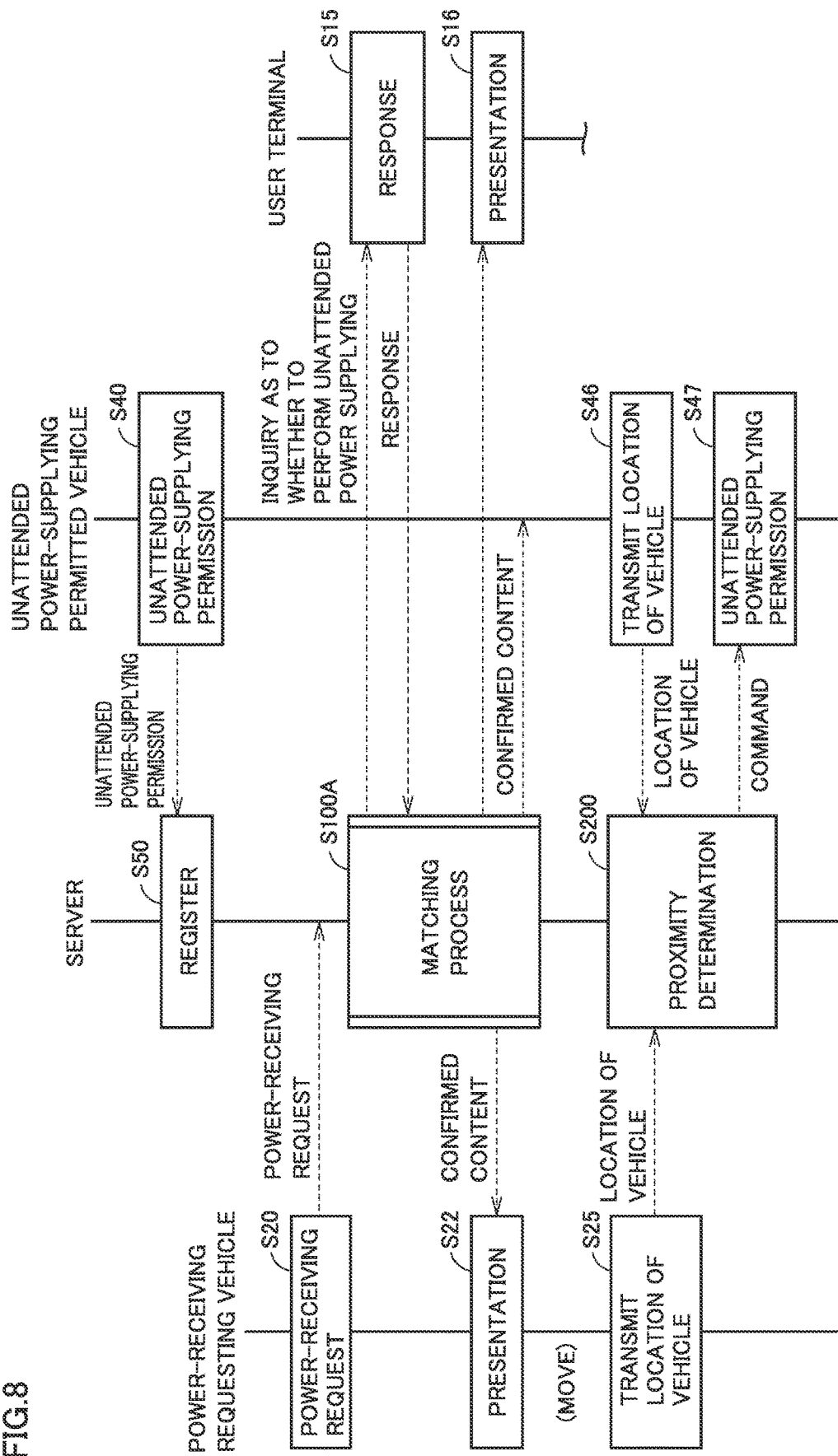
FIG. 8 is a second sequence diagram showing an exemplary process performed among the power-receiving requesting vehicle, the server, the unattended power-supplying permitted vehicle, and a user terminal.

FIG. 8 is a sequence diagram showing an exemplary process performed among the power-receiving requesting vehicle, server 300, the unattended power-supplying permitted vehicle, and user terminal 184 according to modification 4. It should be noted that the sequence diagram shown in FIG. 8 is obtained by respectively changing steps S100, S24, S42, and S44 in the sequence diagram shown in FIG. 6 to steps S100A, S25, S46, and S47, and adding a step S200 thereto. The other steps (steps given the same numerals as those of the steps in FIG. 6) are the same and therefore will not be described repeatedly here in detail.

In the matching process (step S100A), server 300 matches the unattended power-supplying vehicle and the power-receiving vehicle in the same manner as that in the above-described first embodiment. Then, server 300 notifies the confirmed matching content to the matched unattended power-supplying vehicle and power-receiving vehicle. Although this confirmed matching content includes the fact that the matching has been confirmed and the information about the matched vehicles, the confirmed matching content does not include the information of the authentication key.

The unattended power-supplying vehicle having received the confirmed matching content from server 300 transmits, to server 300, information indicating the location information (GPS information) of the unattended power-supplying vehicle (step S46).

On the other hand, when moving toward the unattended power-supplying vehicle, the power-receiving vehicle having received the confirmed matching content from server 300 transmits the location information (GPS information) of the power-receiving vehicle to server 300 in real time (step S25).

Server 300 performs a "proximity determination" to determine whether or not the power-receiving vehicle is parked in proximity of the unattended power-supplying vehicle, using the GPS information received from the unattended power-supplying vehicle and the GPS information received from the power-receiving vehicle (step S200). When it is determined that the power-receiving vehicle is parked in proximity of the unattended power-supplying vehicle, server 300 transmits the unattended power-supplying permission command to the unattended power-supplying vehicle.

When the unattended power-supplying vehicle receives the unattended power-supplying permission command from server 300, the unattended power-supplying vehicle unlocks lid 192 of the unattended power-supplying vehicle and permits the unattended power supplying (step S47).

In this way, the unattended power supplying in consideration of security can be implemented without using the authentication keys.

<Modification 5>

In modification 4 described above, it has been illustratively described that the proximity determination is performed by server 300; however, the proximity determination may be performed by the matched unattended power-supplying vehicle.

Figure 9:
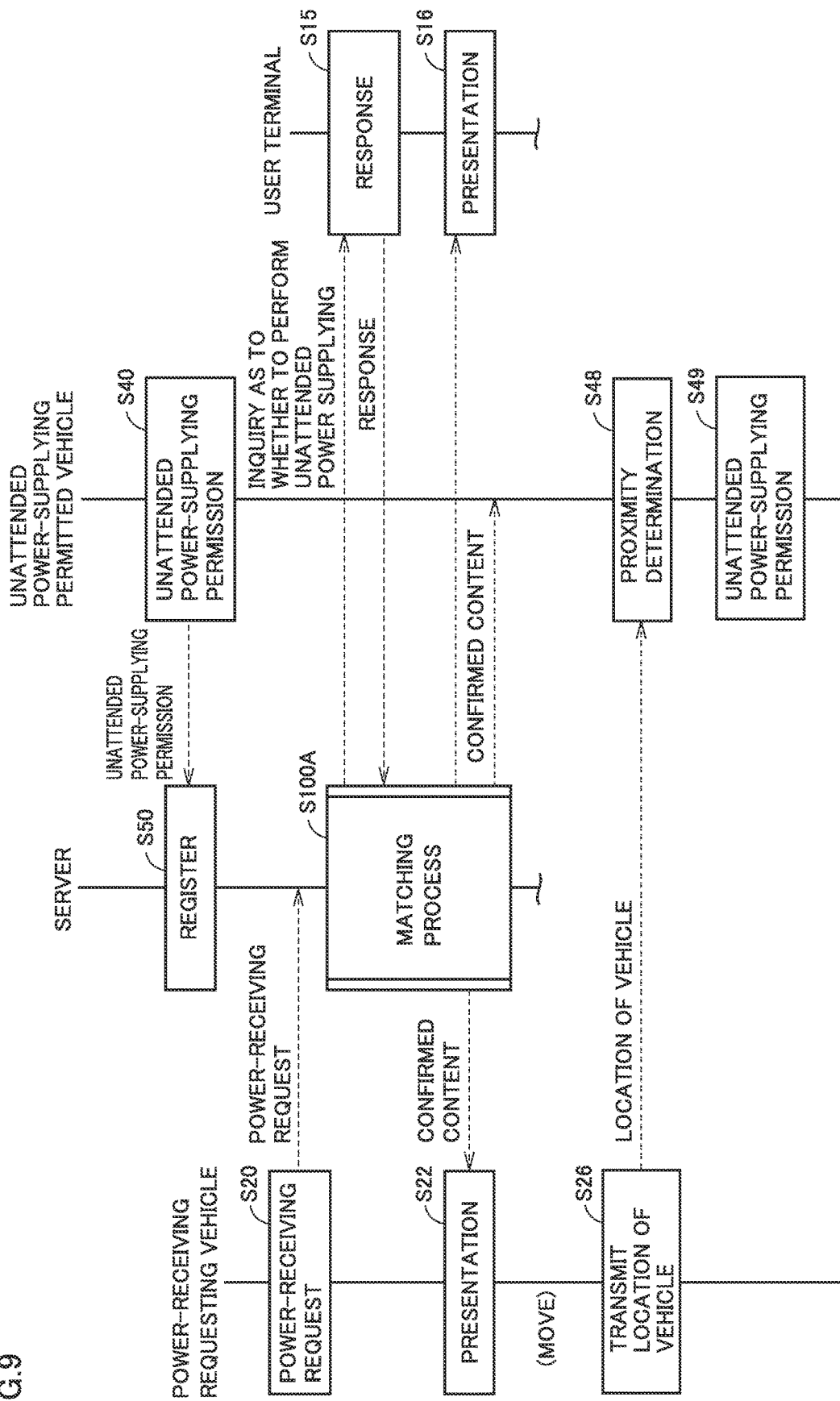
FIG. 9 is a third sequence diagram showing an exemplary process performed among the power-receiving requesting vehicle, the server, the unattended power-supplying permitted vehicle, and the user terminal.

FIG. 9 is a sequence diagram showing an exemplary process performed among the power-receiving requesting vehicle, server 300, the unattended power-supplying permitted vehicle, and user terminal 184 according to a modification 5. The sequence diagram shown in FIG. 9 is obtained by deleting steps S25, S200, S46, and S47 from the sequence diagram shown in FIG. 8, and adding steps S26, S48, and S49 thereto. The other steps (steps given the same numerals as those of the steps in FIG. 8) are the same and therefore will not be described repeatedly here in detail.

When moving toward the unattended power-supplying vehicle, the power-receiving vehicle having received the confirmed matching content from server 300 transmits the location information (GPS information) of the power-receiving vehicle to the matched unattended power-supplying vehicle in real time (step S26).

The unattended power-supplying vehicle performs a "proximity determination" to determine whether or not the power-receiving vehicle is parked in proximity of the unattended power-supplying vehicle, using the GPS information received from the power-receiving vehicle and the GPS information of the unattended power-supplying vehicle (step S48). When it is determined that the power-receiving vehicle is parked in proximity of the unattended power-supplying vehicle, the unattended power-supplying vehicle unlocks lid 192 of the unattended power-supplying vehicle and permits the unattended power supplying (step S49).

Thus, the proximity determination may be performed by the unattended power-supplying vehicle.

<Modification 6>

In each of modifications 4 and 5 described above, it has been illustratively described that the proximity determination is performed using the GPS information; however, the proximity determination may be performed using image information captured by camera 196 mounted on each vehicle.

For example, each vehicle transmits, to server 300 in real time, image information captured by camera 196 of the vehicle, and server 300 determines whether or not there is a registration number of the matched counterpart vehicle in the captured image of the vehicle. When it is determined that the registration number of the matched counterpart vehicle is in the captured image of each vehicle, server 300 transmits the unattended power-supplying permission command to the unattended power-supplying vehicle, and the unattended power-supplying vehicle having received the unattended power-supplying permission command unlocks lid 192 of the unattended power-supplying vehicle, and permits unattended power supplying. Thus, server 300 may perform the proximity determination using the image information captured by camera 196 of each vehicle.

Alternatively, the proximity determination may be performed by the unattended power-supplying vehicle using image information captured by camera 196 of the unattended power-supplying vehicle. Specifically, the unattended power-supplying vehicle may determine whether or not the registration number of the matched counterpart power-receiving vehicle is in the captured image of camera 196 of the unattended power-supplying vehicle, and may unlock lid 192 of the unattended power-supplying vehicle and may permit unattended power supplying when the registration number of the matched counterpart power-receiving vehicle is in the captured image of camera 196 of the unattended power-supplying vehicle.

<Modification 7>

In order to actually exchange power between the matched unattended power-supplying vehicle and power-receiving vehicle, the power-receiving vehicle needs to be parked and arranged around the unattended power-supplying vehicle, and both the vehicles need to be physically connected to each other using charging cable 500. Therefore, the unattended power-supplying vehicle is desirably parked in such a parking state (hereinafter, also referred to as "power-supplying possible state") that the power-receiving vehicle can be parked and arranged therearound to facilitate the operation of connecting charging cable 500 to both the vehicles.

In view of this, in the matching process, whether to determine the unattended power-supplying vehicle as a subject of the matching may be determined in accordance with whether or not the parking state of the unattended power-supplying vehicle is the power-supplying possible state. In this way, it is possible prevent occurrence of the following situation in advance: the power-receiving vehicle is moved to near the unattended power-supplying vehicle after the matching but the power-receiving vehicle and the unattended power-supplying vehicle cannot be actually connected to each other, with the result that the unattended power supplying cannot be performed.

Various methods can be considered for a method of determining whether or not the parking state of the unattended power-supplying vehicle is the power-supplying possible state. For example, it may be determined that the parking state of the unattended power-supplying vehicle is the power-supplying possible state, when it can be confirmed, using camera 196 or another sensor (a laser, a proximity sensor, or the like) mounted on the unattended power-supplying vehicle, that there is no obstacle in supplying power around the unattended power-supplying vehicle. Alternatively, it may be determined that the parking state of the unattended power-supplying vehicle is the power-supplying possible state, when it can be confirmed, using a gyro sensor mounted on the unattended power-supplying vehicle, that the unattended power-supplying vehicle is parked on a flat road surface in view of such a fact that it is difficult to park the vehicle or handle charging cable 500 on a steep road surface. Alternatively, it may be determined that the parking state of the unattended power-supplying vehicle is the power-supplying possible state, when it can be confirmed, based on the parking location (GPS information) of the unattended power-supplying vehicle and the map information, that the unattended power-supplying vehicle is not parked in a special location (a private location that other vehicles cannot enter, a racing circuit, a toll parking area, or the like).

Moreover, the determination as to whether or not the parking state of the unattended power-supplying vehicle is the power-supplying possible state may be made by the unattended power-supplying vehicle or may be made by server 300 having received, from the unattended power-supplying vehicle, information of the surroundings detected by the unattended power-supplying vehicle.

FIG. 10 is a flowchart showing an exemplary detailed procedure of the matching process when the server determines the parking state of the unattended power-supplying vehicle. The flowchart shown in FIG. 10 is obtained by adding steps S121 to S123 to the flowchart shown in FIG. 7. The other steps (steps given the same numerals as those of the steps in FIG. 7) are the same and therefore will not be described repeatedly here in detail.

When the candidate power-supplying vehicle is an unattended power-supplying permitted vehicle (YES in step S120), server 300 requests the candidate power-supplying vehicle to transmit parking information of the candidate power-supplying vehicle (step S121). In response to this request, the candidate power-supplying vehicle transmits, to server 300, parking information (the captured-image information of camera 196, the detection information of the gyro sensor, the GPS information, or the like) detected by a sensor of the candidate power-supplying vehicle.

Server 300 obtains the parking information from the candidate power-supplying vehicle (step S122), and uses the parking information to determine whether or not the parking state of the unattended power-supplying vehicle is the power-supplying possible state (step S123).

When the parking state of the unattended power-supplying vehicle is the power-supplying possible state (YES in step S123), server 300 transfers the process to step S126 and continues the matching process after step S126.

On the other hand, when the parking state of the unattended power-supplying vehicle is not the power-supplying possible state (YES in step S123), server 300 notifies the candidate power-receiving vehicle that the matching is not established (step S150).

Thus, in modification 7, when the parking state of the unattended power-supplying vehicle is not the power-supplying possible state, the unattended power-supplying vehicle is excluded from subjects of the matching. In this way, it is possible to prevent occurrence of the following situation: the power-receiving vehicle is moved to near the unattended power-supplying vehicle after the matching but the power-receiving vehicle and the unattended power-supplying vehicle cannot be actually connected to each other, with the result that the unattended power supplying cannot be performed.

<Modification 8>

In the above-described embodiment, it has been described that one power-supplying vehicle and one power-receiving vehicle are matched through the matching process. However, a combination of the matched vehicles is not limited to this. For example, two or more power-receiving vehicles can be matched to one power-supplying vehicle.

<Modification 9>

The confirmed matching content notified to the matched vehicles by server 300 is not limited only to the information described in the above-described embodiment. For example, in addition to the above-described information, the confirmed matching content may include: a distance from the power-receiving vehicle to the unattended power-supplying vehicle; a time required by the power-receiving vehicle to move to the location of the unattended power-supplying vehicle; a power amount that can be supplied by the unattended power-supplying vehicle; a power amount requested to receive by the power-receiving vehicle; and user information (such as contact information) of the matching counterpart.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An information providing system comprising:
   a plurality of vehicles each including a power converting device configured to exchange power with another vehicle; and
   a server including a communicator configured to communicate with the plurality of vehicles, the server being configured to perform a matching process for setting a power-supplying vehicle and a power-receiving vehicle from the plurality of vehicles and for matching the set power-supplying vehicle and power-receiving vehicle, wherein
   each of the plurality vehicles includes a communicator,
   each of the plurality of vehicles is configured to transmit via the communicator of the vehicle unattended power-supplying permission information to the server when a user of the vehicle performs an operation of permitting unattended power supplying in which power is supplied from the vehicle to another vehicle without attendance of the user, and
   in the matching process, the server is configured to permit to set, as the power-supplying vehicle, a vehicle included in the plurality of vehicles and having transmitted the unattended power-supplying permission information to the server.

2. The information providing system according to claim 1, wherein
   the server is configured to transmit via the communicator of server a matching notification to the power-supplying vehicle matched in the matching process, the matching notification including information of the matched power-receiving vehicle, and
   the vehicle having transmitted the unattended power-supplying permission information to the server is configured to permit the unattended power supplying for the matched power-receiving vehicle when the matching notification is received from the server.

3. The information providing system according to claim 2, wherein
   each of the plurality of vehicles includes
      a power connector connectable to another vehicle, the power connector being configured to connect to the power converting device,
      a lid configured to be opened and closed for the power connector, and
      a locking device configured to lock the lid in a close state, and
   when the matching notification is received from the server, the vehicle having transmitted the unattended power-supplying permission information to the server is configured to unlock the lid and permit the unattended power supplying for the matched power-receiving vehicle in response to the matched power-receiving vehicle being parked in proximity of the vehicle having transmitted the unattended power-supplying permission information.

4. The information providing system according to claim 1, wherein
   each of the plurality of vehicles includes a detector configured to detect surrounding information of the vehicle, and
   in the matching process, the server is configured to permit to set, as the power-supplying vehicle, a vehicle that is included in the plurality of vehicles and that has transmitted the unattended power-supplying permission information and that is determined, based on a detection result of the detector, to be in a state that power is able to be supplied to another vehicle.

5. A server device comprising:
a communicator configured to communicate with a plurality of vehicles each including a power converting device configured to exchange power with another vehicle;
a controller configured to perform a matching process for setting a power-supplying vehicle and a power-receiving vehicle from the plurality of vehicles and for matching the set power-supplying vehicle and power-receiving vehicle; and
a storage configured to store information of the plurality of vehicles, wherein
each of the plurality vehicles includes a communicator,
each of the plurality of vehicles is configured to transmit via the communicator of the vehicle unattended power-supplying permission information to the communicator of the server when a user of the vehicle performs an operation of permitting unattended power supplying in which power is supplied from the vehicle to another vehicle without attendance of the user, and
in the matching process, the controller is configured to permit to set, as the power-supplying vehicle from the plurality of vehicles, a vehicle having transmitted the unattended power-supplying permission information.

* * * * *